United States Patent

[11] 3,626,189

[72] Inventor Otto E. Berg
Forest Heights, Md.
[21] Appl. No. 789,044
[22] Filed Dec. 31, 1968
[45] Patented Dec. 7, 1971
[73] Assignee The United States of America as represented by the Administrator of the National Aeronautics and Space Administration

[54] COSMIC DUST SENSOR
15 Claims, 4 Drawing Figs.

[52] U.S. Cl. .................................................. 250/83.6 R
[51] Int. Cl. ..................................................... G01t 1/18
[50] Field of Search ........................................... 250/83.6,
83.65; 324/70 B, 178

[56] References Cited
UNITED STATES PATENTS
2,535,066 12/1950 Herzog .................................. 250/83.6
3,234,386 2/1966 Leventhal et al. ............ 250/83.6 X
3,296,526 1/1967 Kinard et al. .................. 324/70

Primary Examiner—James W. Lawrence
Assistant Examiner—Davis L. Willis
Attorneys—R. F. Kempf, E. Levy and G. I. McCoy ABSTRACT: A sensor for detecting and measuring the energy, velocity and direction of travel of a cosmic dust particle, comprises an array of electrodes. Some of the electrodes are arranged in columns and spaced in close proximity to other electrodes that are disposed in rows. Together the columns and rows define a plurality of sectors through which a cosmic particle may traverse. Each electrode includes electrically biased conductor layers supported on an optically transparent matrix. Ions and electrons from an impacting cosmic dust particle compose an ionized plasma for collection on the electrically biased conductors, creating an electrical output pulse which may be amplified. A second array of electrodes in columns and grids in rows is included in spaced relationship from the first array. An impacting cosmic dust particle on the second array produces an electrical output pulse in the same manner as described. Should a particle penetrate the first array and impact upon the second spaced array, a pair of time spaced electrical outputs will result, the time spacing of the pulses being proportional to the velocity of the particle. The direction of the particle's travel, and thereby its origin in space is determined by the alignment of respective sectors traversed by the particle. Behind the second array is placed a microphone plate which arrests further penetration of the particle. The microphone output amplitude is an indication of the momentum of a particle. At least one of the secottors in each of the arrays is bounded by an epoxy coating rendering it impervious to plasma collection. Accordingly, a pulse output originated from the impervious sector gives an indication of noise or other interference collected by the sensor. Additionally, a second microphone of small area is segregated from the first-described microphone and is provided with a separate output. Accordingly, electrical signals from the small microphone which are disproportionate with respect to the small area of the second microphone are indicative of interfering noise as well as particle impact.

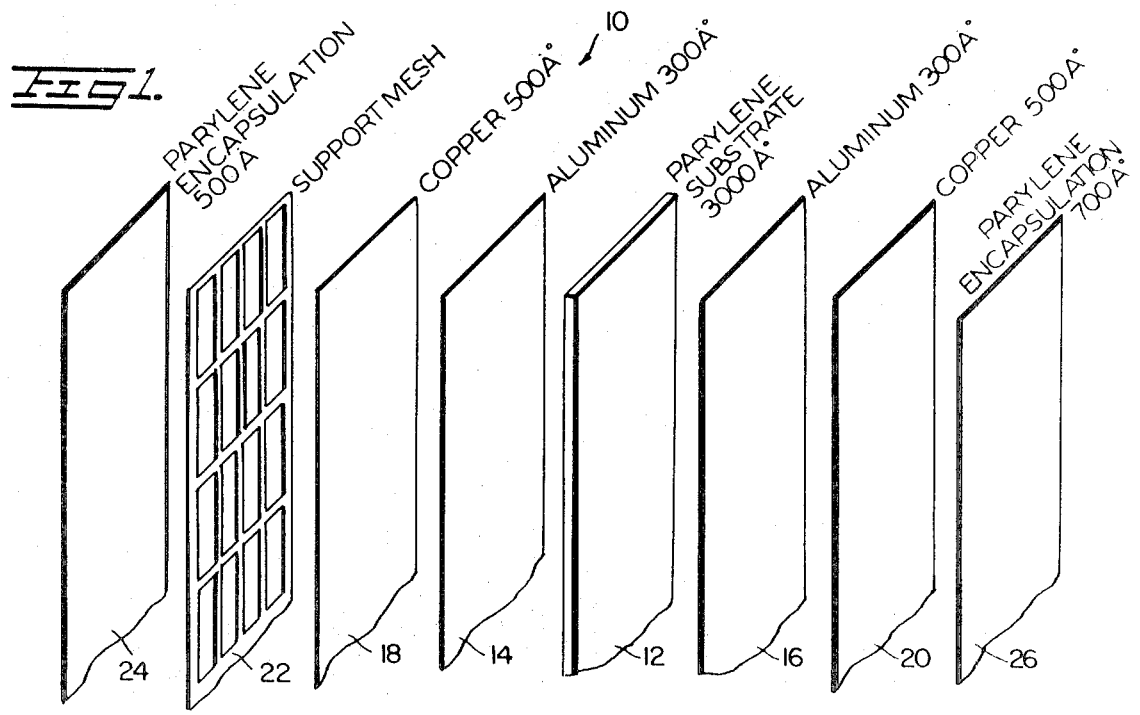
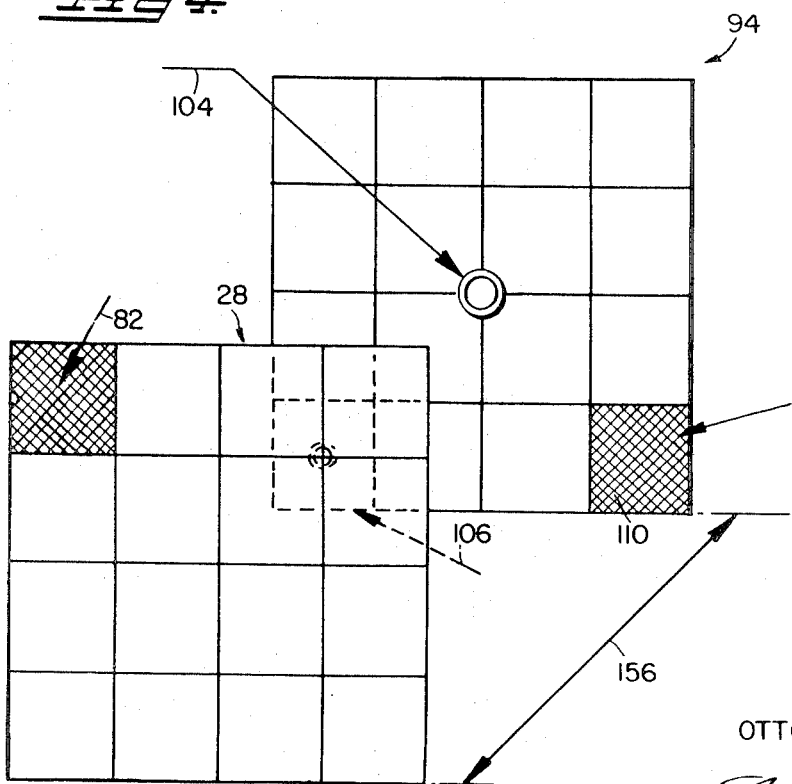

INVENTOR
OTTO E. BERG
BY
ATTORNEYS

COSMIC DUST SENSOR

The invention described herein was made by an employee of the U.S. Government and may be manufactured or used by or for the U.S. Government for governmental purposes without the payment of any royalties thereon or therefor.

The present invention relates generally to a particle sensor, and more specifically, to a sensor for determining the density, velocity, kinetic energy and direction of particles, for example, cosmic dust particles.

The sensor according to the invention comprises a first and a second array of electrically biased, particle impact sensitive films. In each array, plurality of the films are arranged in sequential columns and rows. The rows and columns define a plurality of adjacent sectors for registering the location of a particle which imparts the array. The films are fabricated from layers of a conductive material supported on an optically transparent matrix. The columns and rows are electrically biased positively and negatively, respectively. An impacting particle produces an ionized plasma comprising ions and electrons, the positively biased columns collect the electrons and the negatively biased rows collect the ions. Such collection produces an electrical output pulse from each of the columns and rows impacted by the particle, which pulse may be detected, amplified and recorded. The amplitude of the pulse is indicative of particle energy. Additionally, each array may be bounded by outer enlarged, negatively biased films or grids which prevent electrons of the plasma produced at the array from escaping therefrom.

The two arrays, together with their boundary films are placed in spaced relationship. An impacting particle which penetrates the first array and impacts the second will thus produce electrical pulses in time spaced relationship. The time spacing of the pulses is directly proportional to particle velocity. The origin in space of the impacting particle is determined by the alignment of the sectors in each of the spaced arrays penetrated by the particles.

Behind the second array is located a microphone plate which arrests further penetration of an impacting particle. The output amplitude of the microphone upon impact by a particle is indicative of the particle's momentum.

The number of array and microphone output pulses produced within a predetermined time period is indicative of particle density.

At least one sector of each array is provided with epoxy coverings rendering such sectors impervious to collection of ionized plasma. Accordingly, pulse outputs from the impervious sectors are due to noise or other interference. Similarly, a portion of the microphone sensor is segregated and provided with a separate output. Although the segregated portion detects particle impact, ideally the electrical pulses resulting therefrom should be proportionally reduced from those produced by the main portion of the microphone. Should such proportion of pulses vary, the disproportionate number of pulses thus produced is an indication of noise or other interference. Accordingly, the effect of the pulses resulting from the impervious sectors and the segregated portion of the microphone should be subtracted from the recorded pulse data in order to give a true indication of particle detection.

Accordingly, it is in object of the invention to provide a new and improved particle sensor.

A further object of the invention is to provide a particle sensor which measures the energy, momentum, velocity and direction of a particle imparting or penetrating the sensor.

Another object of the invention is to provide an acoustic sensor for measuring the momentum of a particle impacting thereon.

Still another object of the invention is to provide a particle sensor having a noise and other interference detector adapted for the same environment as the main sensor.

Other objects and many attendant advantages of the present invention will become apparent upon perusal of the following detailed description taken in conjunction with the accompanying drawings wherein:

FIG. 1 is a schematic representation of one of the films included in each array of the present invention;

FIG. 4 is a diagrammatic representation illustrating the particle direction determining sectors provided by the spaced arrays.

Figure 3:
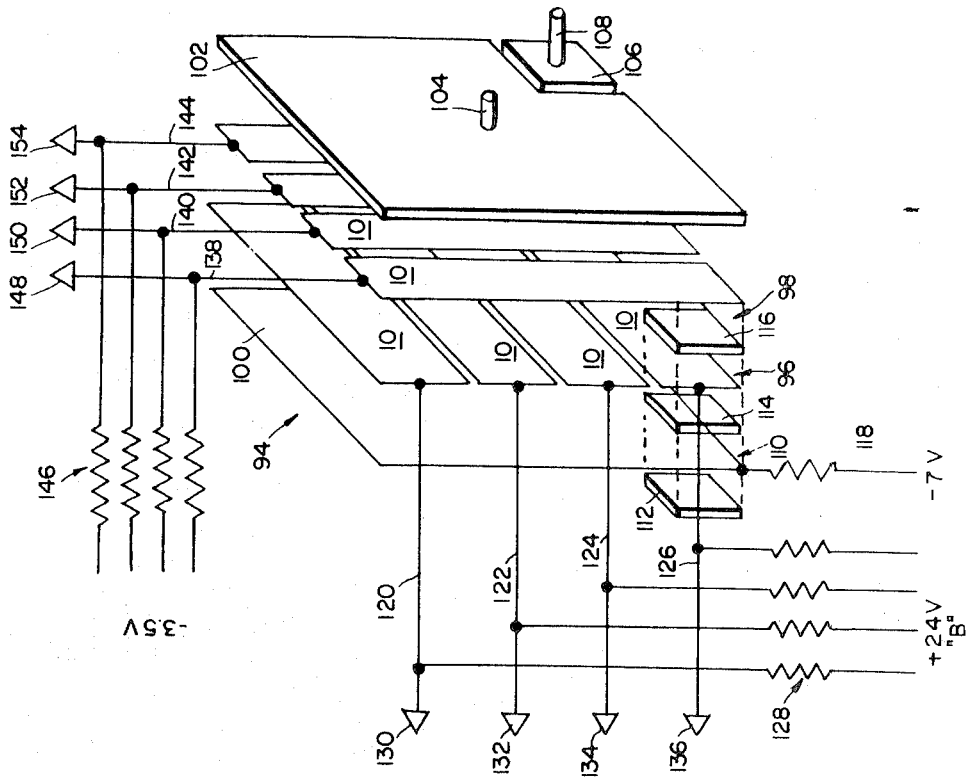
FIG. 3 is a schematic representation in perspective of a second array of films arranged in sequential columns and rows in combination with a microphone detector.

With more particular reference to the drawings, there is shown generally at 10 in FIG. 1 an exploded view in schematic of a particle detecting film according to the invention. More specifically, the film comprises a 3,000A.-thick substrate layer 12 of Parylene, a commercially available product of Union Carbide Corporation, Greenville, S.C. The surfaces of the Parylene substrate layer are provided with opposed aluminum layers 14 and 16 of aluminum, which layers are 300A. in thickness and applied, for example, by film evaporation bath techniques. The aluminum surfaced Parylene substrate layer 12 is provided with opposed copper layers 18 and 20 which are 500A. thick and respectively applied directly over the aluminum layers 14 and 16, by film evaporation bath techniques. Aluminum layers 14 and 16 are provided to protect the Parylene substrate layer 12 from damage while the copper layers 18 and 20 are applied thereon.

The copper layer 18 may be provided thereover with an overlying support mesh 22, preferably comprising a commercially available optically transparent nickel mesh manufactured by the Buckbye-Meers Corporation, Minneapolis, Minn. The grid 22 is made to adhere to the copper layer 18 by interposing therebetween a thin film of a dielectric bonding agent, such as a commercially available liquid polysiloxane. A 500A.-thick encapsulation layer 24 overlies the support mesh 22. The remaining copper layer 20 is provided with an overlying 700A.-thick layer 26 of Parylene.

Accordingly, the structure thus described provides a multilayer composite film, the support mesh 22 providing mechanical rigidity to the film and the encapsulation layers 24 and 26 serving to isolate the copper layers 18 and 20 from the corrosive effect of ambient atmosphere.

Figure 2:
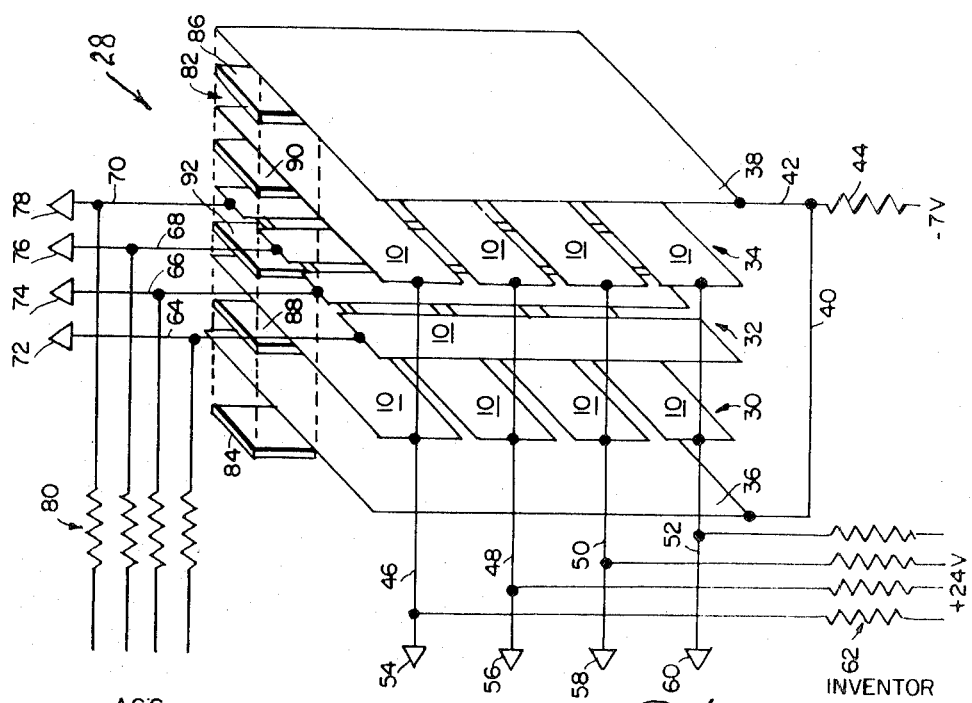
FIG. 2 is a schematic representation in perspective of a first array according to the invention that comprises a plurality of electrically biased films arranged in sequential columns and rows.

With reference to FIG. 2, there is shown generally a first array 28 of films 10 arranged in spaced sequential columns and rows. Array 28 is illustrated schematically and in perspective as including a first electrode 30 that includes four composite, metal films 10, insulated from each other in rectangular strip form and arranged in parallel spaced relationship to form a coplanar row of composite films. Similarly, four additional composite metal strips or 10 films insulated from each other of similar rectangular strip configuration are disposed in parallel spaced relationship to form coplanar columns of strips comprising electrode 32. Electrode 34 includes, four additional composite, strips 10 insulated from each other of rectangular strip configuration that are placed in adjacent spaced relationship to form coplanar row of composite strips. Accordingly, the rows and columns of the strips comprising electrodes 30, 32 and 34 together comprise spaced sequential alternate rows and columns of particle detecting films.

The array 28 is further provided with outer boundaries defined by composite metal films that form electrodes 36 and 38. Each of the films 36 and 38 is similar in fabrication to the composite film 10 of FIG. 1. The boundary films 36 and 39 and the rows and columns 30, 32 and 34 are retained in adjacent parallel relationship by any well-known mechanical supporting means (not shown). Additionally, the boundary films 36 and 38 and the rows and columns 30, 32 and 34 are of the same area.

The boundary films 36 and 38 are provided with electrical conductors, illustrated schematically at 40 and 42. Both conductors 40 and 42 are connected at 44 to a source of electrical potential (not shown) which biases the copper layers in each of the composite films 36 and 38 to a minus 7v.-potential. Each of the adjacent composite films 10 in the rows 30 and 34 is provided with an electrical conductor. More specifically, each of four conductors 46, 48, 50, and 52, is respectively connected to a corresponding pair of composite film strips 10, the strips of each pair being selected from both electrode rows 30 and 34. Accordingly, the corresponding horizontally elongated composite strips of electrode rows 30 and 34 are provided with a common conductor. The conductors 46, 48, 50 and 52 are respectively connected to amplifiers illustrated schematically at 54, 56, 58 and 60. Additionally, each of the conductors is connected as shown generally at 62 to a source of electrical potential (not shown) which biases the corresponding film strip in the rows 30 and 34 to a positive 24v.-potential.

In similar fashion, each vertically extending composite strip 10 of the column electrode 32 is provided with separate conductors 64, 66, 68 and 70 as schematically illustrated in FIG. 2. Each of the conductors is connected with a separate one of amplifiers 72, 74, 76 and 78. Additionally, each of the conductors 64, 66, 68 and 70 is connected through resistors 80 to a source of electrical potential (not shown) which electrically biases each of the column electrodes 32 to a minus 3.5 potential.

With reference to FIG. 4, taken in conjunction with FIG. 2, the row and column electrodes 30, 32 and 34 provide, as shown schematically in FIG. 4, a plurality of adjacent sectors, 16 in number. More specifically, each sector is defined by an area formed by the overlapped portion of each of the column composite strips with the adjacent rows of strips in each of the rows 30 and 34. Since there are four strips arranged in rectangular columns and four strips arranged in each of the rectangular rows, 16 rectangular sectors are provided. For example, with reference to FIG. 2 one of such sectors is illustrated generally in dotted outline at 82. In FIG. 4, the end of the rectangular sector 82 is illustrated with grid shading. The superimposed portions of the composite film strips disposed within the sector 82 are provided with a coating of epoxy similar in configuration to the grid shaded end portion of the sector 82. For example, as shown in exploded form in FIG. 2, the portions of the boundary films 36 and 38 are disposed within the sector 82 are covered with epoxy layers 84 and 86 respectively. Similarly, the portions of the composite films in each of the rows 30 and 34 disposed within the sector 82 are covered with epoxy layers 88 and 90, respectively. The portion of the columns of films 32 disposed within the sector 82 is covered with a layer of epoxy 92.

With reference to FIG. 3, there is shown generally a second array 94 of particle detecting films similar in configuration to the first array 28 of FIG. 2 A plurality of a particle detecting films 10 as described with reference to FIG. 1, are of generally rectangular strip configuration and disposed in adjacent parallel coplanar relationship to form a row of film electrodes 96. Four additional strip configured particle detection films 10 are arranged in adjacent parallel relationship to form coplanar columns of detection electrodes 98.

Disposed in parallel adjacent spaced relationship from the row 96 of detector films is an enlarged boundary film 100 similar in fabrication to the particle detection strip 10 as described in FIG. 1. An enlarged microphone plate 102 is disposed in parallel spaced relationship with respect to the columns 98 of particle detection films. The microphone plate 102 is a one-sixteenth inch thick quartz acoustical sensor plate having a 60 micron thick molybdenum layer cemented thereon, the molybdenum layer facing the columns 98 of particle detecting film.

The microphone plate 102 is provided with a generally central well-known microphone button 104. A portion 106 of the microphone plate 102 is segregated from the main portion 104. The segregated portion 106 is one-fifteenth of the total area of the remaining portion of the microphone plate 102 and is provided with a separate well-known microphone button 108. The enlarged boundary film 100 and the microphone plate 102, together with its segregated portion 106, are of the same area and are maintained in adjacent spaced relationship by any well-known mechanical support means (not shown).

The row and column electrodes 96 and 98 of particle detecting films appear superimposed, as shown in FIG. 4, to form a plurality of adjacent sectors. More specifically, with reference to FIG. 4, taken in conjunction with FIG. 3, one of the sectors is illustrated schematically in dotted outline by rectangular sector 110. With reference to FIG. 4, the end portion of the exemplary sector 110 is illustrated in grid shading. Additionally, the microphone plate output 104 is illustrated schematically generally centrally of the sectors in the array 94. The segregated portion 106 of the microphone plate is illustrated as it would appear in its relationship with the sectors formed by the superimposed rows and columns of strip detector films.

With reference to FIG. 3, each superimposed portion of the films in the array 94 which are within the exemplary sector 100 is covered with an epoxy coating. For example, the portion of the boundary film 100 within the sector 110 is provided with a coating 112 of epoxy, illustrated in exploded configuration. Similarly, the portion of the rows 96 of the particle detection films 10 which is within the sector 110 is provided with an epoxy coating 114. The portion of the columns 96 of particle detection films within the sector 110 is covered with a coating of epoxy, shown in exploded form at 116.

The boundary film 100 is provided with an electrical conductor 118 which is connected to a source of electrical potential (not shown) which biases the conductive copper layers within the film 100 to a minus 7 volts potential. The strip films in row electrodes 96 of particle detecting films are respectively connected to conductors 120, 122, 124 and 126. Each of the conductors is connected through resistors 128 to a source of electrical potential (not shown) which biases each of the conductive copper layers within the row electrode 96 of particle detecting films to a plus 24 volts potential. Additionally, each of the conductors 120, 122, 124 and 126 connects a respective film to the input of a different one of amplifiers 130, 132, 134 and 136. Each of the columns 98 of particle detecting film is corrected to a different one of conductors 138, 140, 142 and 144. The conductors are connected through resistors 146 to a source of electrical potential (not shown) which biases each of the conductive copper layers within the columns 98 of film detectors to a minus 3.5 volts potential. Further, each of the conductors 138, 140, 142 and 144 connects a respective strip film detector to the input of a different one of amplifiers 148, 150, 152 and 154.

With reference to Fig. 4, the first and second arrays 28 and 94 are supported in parallel relationship, spaced from each other by a distance, shown generally at 156, of 10 centimeters. Each rectangular sector in the array 28 has an exemplary cross section of 1 square inch. A one-eighth inch spacing is maintained between each of the parallel superimposed layers of strips included in electrodes 36, 30, 32, 34 and 38, thereby lending a depth of approximately one-half inch to each of the sectors in the array 28.

With reference to FIG. 3, it is seen that a one-eighth inch spacing is maintained between each of the boundary film 100, the rows of films 96, the columns of films 98 and the microphone plate 102, whereby the depth of each of the sectors, for example the sector 112 is approximately three-eighths of an inch.

In operation, a cosmic dust particle to be detected impacts and penetrates the first array 28. Upon impact with the array an ionized plasma is generated by the film 32. The ions and electrons of the plasma are collected on the electrically biased copper layers of the rows and columns of strips in electrodes 30, 32 and 34. More specifically, the positive ions of the plasma returns to and are collected on the negatively biased columns of electrode 32 of particle detecting strips 10 thereby producing an electrical pulse output at the output of at least one of the amplifiers 72, 74, 76 or 78. The electrons of the plasma are collected on both of the row electrodes 30 and 34 of particle detecting strips 10 thereby producing an electrical output pulse at the output of at least one of the amplifiers 54, 56, 58 and 60. The boundary films or electrodes 36 and 38 are negatively biased to prevent escape of the generated electrons from the array 28. Positive ions in the plasma generated by electrodes 32 are repelled by the negative bias of the strips in electrodes 30 and 34. The energy of the impacting cosmic dust particle is directly proportional to the amplitude of the electrical pulses produced by the amplifiers. Additionally, the sector in which the impacting particle has traversed is indicated by which combination of the amplifiers produces the electrical output resulting from ionized plasma generation by the impacting particles. If an impacting particle is of insufficient energy to penetrate the array 28, the amplitude of the resulting output pulse is also a measure of the kinetic energy of the impacting particle.

If a particle is of sufficient energy to penetrate the array 28 and impact the array 94, an ionized plasma is produced from impact with said array 94. Positive ions are collected on the columns of electrode 98 of particle detecting films, whereby an output pulse is delivered from one of the amplifiers 148, 150, 152 or 154. Additionally, the electrons of the produced ionized plasma are collected on the rows of electrode 96, thereby producing an electrical output pulse at the output of at least one of the amplifiers 130, 132, 134 and 136. The boundary film 100 is negatively biased to repel electrons of the ionized plasma and thereby prevent escape thereof from the array 94. By determining which combination of amplifiers produces the output upon impact of a particle, it can be determined in which sector the particle impacts the array 94. Accordingly, by aligning the respective impacted sectors in each of the arrays 28 and 94, the velocity vector and thereby the direction of the origin in space of the impacting cosmic dust particle may be determined.

The pulse outputs from the array 28 is in time spaced relationship with respect to the pulse outputs from the array 94. The time spacing between the outputs of arrays 28 and 94 is inversely proportional to the velocity of the impacting cosmic dust particle.

Upon impact with the array 94, the cosmic dust particle is stopped from further penetration by impact upon the microphone plate 102. Accordingly, the particle transfers all its remaining energy to the microphone plate 102 and produces an acoustic output as a result thereof. The amplitude of the microphone output is thus directly proportional to the momentum of the impacting particle.

A distinguishing feature of the present invention is that the sector 82, containing the epoxy coatings 84, 86, 88, 90 and 92 is impervious to ionized plasma collection, thereby obviating a simultaneous output over the combination of amplifiers 54 and 78. Should such simultaneous outputs occur, they are not due to cosmic dust impact but to electrical noise or other electrical interference. The frequency of such simultaneous pulse output may be compared with the frequency of outputs of the entire array 28 in order to determine the accuracy of the output pulses of the amplifiers as representative of the number of actual impacts by cosmic dust particles.

In similar fashion, the sector 110 of the array 94 is provided with the dielectric coatings 112, 114 and 116 which are impervious to the collection of ions or electrons produced by an impacting particle. Hence, any output signals simultaneously derived from each of amplifiers 136 and 148 is due to electrical noise or other interference.

The segregated portion 106 of the microphone plate 102 is approximately one-fifteenth the area of the remaining portion of the microphone plate. Accordingly, during operation electrical pulses produced at the outputs 104 and 108 should have an amplitude ratio of 15 to 1. If a greater ratio of pulses is produced by the outputs 104 and 108, the pulses are due to electrical noise or other electrical interference. Accordingly, the proper ratio of output pulses is indicative of the reliability of the output pulses as a measure of particle momentum.

Another feature of the apparatus is that the physical and electronic conditions thereof may be checked. The films of each array are closely spaced and have therebetween an appreciable relative capacitance. Accordingly, a large electrical pulse may be generated by a suitable command signal and impressed on each of the arrays to induce via capacitance an electrical pulse output over the associated amplifiers. The presence of electrical pulses over the amplifiers in response to the impressed electrical pulse is indicative that the arrays are operative. Accordingly, the proper performance of array may be easily checked by the prescribed procedure.

In actual practice the boundary films 36, 38 and 100 may alternatively comprise open mesh grids, to enable cosmic dust particles to pass through them more readily. Accordingly, either films or grids may be utilized in preferred embodiments of the invention.

Similarly, in each of the arrays 28 and 94, the rows 30, 34 and 96 of films may alternatively comprise open mesh grids in preferred embodiments of the invention to enable the dust particles to pass through them.

Other modifications and embodiments of the present invention may be fabricated without departures from the scope of the invention as described in the appended claims.

What is claimed is:

1. A detector for cosmic dust or other similar outer space particles comprising biased first electrode means for deriving a plasma stream in response to said particles impinging thereon, second electrode means biased with the opposite polarity from said first electrode means for collecting charged carriers in the plasma stream, means connected to said first electrode means for deriving a first signal in response to the plasma stream being derived by the first electrode means and charged carriers in the stream returning to the first electrode means, and means connected to said second electrode means for deriving a second signal in response to charged carriers from the plasma stream being collected thereby, said first electrode means including a first plurality of strips insulated from each other and having parallel longitudinal axes extending in a first direction, said second electrode means including a second plurality of strips insulated from each other and having parallel longitudinal axes extending in a second direction at right angles to the first direction, and means responsive to said first and second signals for indicating the strips of the first and second plurality which receive the charged carriers.

2. The detector of claim 1 further including a third electrode means positioned in the path of charged carriers in the stream that pass through the second electrode means, said third electrode means being biased to repel the charged carriers passing through the second electrode means.

3. The detector of claim 1 wherein said second electrode means includes first and second elements respectively positioned proximate opposite faces of said first electrode means, said first element being configured to enable the particles to pass through it so that they can impinge on the first electrode means.

4. The detector of claim 1 wherein the first element is a mesh.

5. A detector for cosmic dust or other similar outer space particles comprising first biased electrode means for deriving a plasma stream in response to said particles impinging thereon, second electrode means biased with the opposite polarity from said first electrode means for collecting charged carriers in the plasma stream, at least one of said electrodes being segmented into areas insulated from each other, each of said areas defining an impact area for charged carriers in the plasma stream, and means connected to said areas for deriving an indication of the area onto which the charged carriers impact.

6. A detector for cosmic dust or other similar outer space particles comprising first biased electrode means for deriving a plasma stream in response to said particles impinging thereon, second electrode means biased with the opposite polarity from said first electrode means for collecting charged carriers in the plasma stream, a third electrode means positioned in the path of charged carriers in the stream that pass through the second electrode means, said third electrode means being biased to repel the charged carriers passing through the second electrode means.

7. A detector for cosmic dust or other similar outer space particles comprising first biased electrode means for deriving a plasma stream in response to said particles impinging thereon, second electrode means biased with the opposite polarity from said first electrode means for collecting charged carriers in the plasma stream, means connected to one of said electrode means for deriving a signal in response to charged carriers from the plasma stream being collected thereby, said second electrode means including first and second elements respectively positioned proximate opposite faces of said first electrode means, said first element being configured to enable the particles to pass through it so that they can impinge on the first electrode means.

8. The detector of claim 7 wherein the first element is a mesh.

9. The detector of claim 7 wherein the first element is a thin film.

10. The detector of claim 7 further including a third electrode means positioned in the path of charged carriers in the stream that pass through the second electrode means, said third electrode means being biased to repel the charged carriers passing through the second electrode means.

11. The detector of claim 10 wherein the third electrode means includes third and fourth elements respectively positioned outside the first and second elements of said second electrode, said first and third elements being configured to enable the particles to pass through them so that the particles can impinge on the first electrode means.

12. The detector of claim 7 wherein said first electrode means includes a first plurality of strips insulated from each other and having parallel longitudinal axes extending in a first direction, said second electrode means includes a second plurality of strips insulated from each other and having parallel longitudinal axes extending in a second direction at right angles to the first direction, and means responsive to said first and second electrode means collecting charged carriers from the stream for indicating the strips of the first and second plurality which receive the charged carriers.

13. A detector for enabling the velocity vector of cosmic dust or other similar outer space particles to be determined comprising a first array including:
first biased electrode means for deriving a first plasma stream in response to said particles impinging thereon, second electrode means biased with the opposite polarity from said first electrode means for collecting charged carriers in the first plasma stream, both of said first and second electrodes being segmented into areas insulated from each other, each of said areas defining an impact area for charged carriers in the first plasma stream, and means connected to said areas defined by the first and second electrodes for deriving an indication of the area of the first array onto which the charged carriers of the first stream impact; a second array positioned downstream of the first array, said second array including:
third biased electrode means for deriving a second plasma stream in response to said particles impinging thereon, fourth electrode means biased with the opposite polarity from said third electrode means for collecting charged carriers in the second plasma stream, both of said third and fourth electrodes being segmented into areas insulated from each other, each of said areas defining an impact area for charged carriers in the second plasma stream, and means connected to said areas defined by the third and fourth electrodes for deriving an indication of the area of the second array onto which the charged carriers of the second stream impact.

14. The detector of claim 13 further including means responsive to the signals for enabling an indication of the velocity of the particles to be derived.

15. A particle impact sensor apparatus comprising:
first array of electrically conducting films, second array of electrically conducting films in spaced relationship with respect to said first array, first electrical output means associated with said first array, second electrical output means associated with second array, time spaced electrical signals being produced by said first and second output means in response to a particle impacting said arrays, each of said arrays being electrically biased to collect ionized plasma products resulting from impacting by said particle, each of said arrays having electrically positive biased films and electrically negative biased films, said positively biased films being arranged in coplanar rows, said negative biased films being arranged in coplanar columns, said columns and rows being superimposed, a plurality of sectors each defined by a corresponding pair of superimposed column and row arranged films, said electrical output means producing the electrical signals in such a manner as to identify the particular sectors impacted by the particle, portions of the films within at least one of said sectors in each array being provided with dielectric coatings impervious to particle impact thereon.

\* \* \* \* \*